United States Patent [19]

Sacher et al.

[11] Patent Number: 4,491,533

[45] Date of Patent: Jan. 1, 1985

[54] IMMERSION OIL FOR FLUORESCENCE MICROSCOPY

[75] Inventors: Robert L. Sacher; William J. Sacher, both of Newton, N.J.

[73] Assignee: R. P. Cargille Laboratories, Inc., Cedar Grove, N.J.

[21] Appl. No.: 530,479

[22] Filed: Sep. 8, 1983

[51] Int. Cl.³ .......................... G02B 1/06; G02B 3/12; C09K 11/06

[52] U.S. Cl. .................. 252/301.16; 208/12; 208/18; 350/418; 252/1; 252/408.1

[58] Field of Search ............... 350/418; 208/12, 18; 252/301.16

[56] References Cited

U.S. PATENT DOCUMENTS

| | | | |
|---|---|---|---|
| 3,437,402 | 4/1969 | Levins | 350/418 |
| 3,497,562 | 2/1970 | Levins | 350/418 |
| 3,929,667 | 12/1975 | Bautis | 350/418 |
| 3,979,301 | 9/1976 | Ushioda et al. | 350/418 |
| 4,108,794 | 8/1978 | Yonekubo | 350/418 |

OTHER PUBLICATIONS

Kalichevsky et al., "Chemical Refining of Petroleum"; Reinhold Pub. Corp. N.Y. N.Y. 1942 pp. 73 and 106.
Osol et al., United States Dispensatory, 27th ed., Lippincott Co., 1975, pp. 755-756.
Merck Index, 7th ed. 1960, p. 788.

Primary Examiner—Arthur P. Demers
Attorney, Agent, or Firm—Arthur L. Plevy

[57] ABSTRACT

A heavy mineral oil having a relatively high viscosity is employed as an immersion oil for use in fluorescence microscopy. The oil exhibits no auto fluorescent characteristics while exhibiting a compatible refractive index to allow the same to be used with condenser/objective lens systems in fluorescence microscopy.

2 Claims, No Drawings

IMMERSION OIL FOR FLUORESCENCE MICROSCOPY

BACKGROUND OF THE INVENTION

Immersion oil in microscopy is usually applied as a drop connecting the specimen (or the thin glass cover slip on top of the specimen) with the objective lens (usually the lower lens) of the microscope. The immersion oil by replacing the air that would normally fill the space between the specimen and lens, improves the image brightness and resolution because it better matches the optical requirements of refractive index and optical dispersion (the variation of refractive index with the wavelength of light) of the optics of the microscope than does air. Air has a refractive index of 1.000 while the ideal immersion oil has a refractive index of 1.518 (using 5461 angstrom light). Immersion oil can also be used on the condenser lens, or between the slide and cover slip, or anywhere in the optical system of a microscope or other device where it is compatible and useful to improve the quality of the transmitted light.

Fluorescence is the property of a material that when illuminated by light of one wavelength, emits (Fluoresces) light of another wavelength. In fluoresecent microscopy it is the fluorescence of the specimen that is viewed. If the immersion oil used also fluoresces, this can cause sufficient background fluorescence to obscure the fluorescence of the specimen.

In regard to providing an immersion oil for fluorescence microscopes reference is made to U.S. Pat. No. 4,108,794 entitled OIL IMMERSION FOR FLUORESCENCE MICROSCOPES issued on Aug. 22, 1978 to K. Yonekubo. This patent discloses an immersion oil consisting of silicone oil for fluorescence microscopes which does not emit any auto fluorescence. In any event, the refractive index of such an oil is low as compared to the desired index of 1.518. The oil is relatively expensive and difficult to work with.

In spite of this, there are currently no immersion oils on the market that have the necessary optical properties and do not fluoresce. Although much of fluorescent microscopy can be done despite the background fluorescence of the immersion oil used a non-fluorescing immersion oil of the proper optical nature would be of great use in current techniques and might permit new techniques.

BRIEF DESCRIPTION OF THE PREFERRED EMBODIMENT

An immersion oil for use in fluorescence microscopy which oil exhibits substantially little background fluorescence when illuminated by near ultra violet light comprising a high viscosity mineral oil having a viscosity of greater than 150 centistokes.

DETAILED DESCRIPTION OF THE INVENTION

Standard type white mineral oil exhibits little or no background fluorescence when illuminated by near ultra violet light which generally causes the most noticeable background fluorescence in immersion oil. Mineral oil is available in grades ranging from a low viscosity oil of about 13 centistokes and a refractive index of about 1.46 (using 5461 angstrom light) to a high viscosity oil of about 160 centistokes and a refractive index of 1.48. The higher viscosity oil is not only closest to the ideal refractive index of 1.518 but the higher viscosity does a better job of bridging the gap between the microscope specimen (or cover slip) and objective lens. The use of a mineral oil with a viscosity of greater than 150 centistokes will provide a proper refractive index and serve as an immersion oil for fluorescence microscopy. Mineral oil is sometimes referred to as Liquid Petroleum and is a mixture of liquid hydrocarbons from petroleum. It is a colorless, oily liquid which has little taste and odor even when warmed. The heavy mineral oils which may be employed as immersion oils have densities between 0.875–0.905.

EXAMPLE

| Properties of a heavy mineral oil | |
| --- | --- |
| Refractive Index at 23° C. | |
| nD (5893 A) | 1.478 |
| ne (5461 A) | 1.480 |
| Optical dispersion as Abbe Ve | 56–57 |
| Viscosity at 25° C. | 162 centistokes |
| Density at 25° C. (gm/cc) | 0.88 |

This immersion oil, although it has a refractive index slightly less than the ideal of ne=1.518, when used with a microscope in comparison with immersion oils that have the ideal refractive index, it showed little or no difference in the quality of the image.

We claim:

1. In a process for using a fluorescent microscope for studying materials which fluoresce in which process an immersion oil is employed in conjunction with the objective lens the improvement therewith of using a heavy mineral oil having a refractive index of about 1.480 as the immersion oil in said process, with said oil having a density between 0.875 to 0.905 and which oil exhibits substantially little background flourescence when illuminated by near ultraviolet light with said oil further having a viscosity of greater than 150 centistokes at 25° C.

2. The process according to claim 1 wherein said oil has a density of 0.88 with a viscosity at 25° C. of 162 centistokes.

* * * * *